United States Patent [19]

Bergamini et al.

[11] Patent Number: 5,740,058
[45] Date of Patent: Apr. 14, 1998

[54] AUTOMATIC POSITIONING SYSTEM

[75] Inventors: Giorgio Bergamini, Bari; Vito Gargano, Bitetto, both of Italy

[73] Assignee: Nuovo Pignone S.p.A., Florence, Italy

[21] Appl. No.: 517,699

[22] Filed: Aug. 22, 1995

[30] Foreign Application Priority Data

Aug. 30, 1994 [IT] Italy ................. MI94A1787

[51] Int. Cl.$^6$ ................................... G05B 19/416
[52] U.S. Cl. ........................... 364/474.27; 364/474.3; 364/474.35; 364/474.03; 364/474.01; 364/569; 318/568.18; 318/567; 318/569; 318/600; 318/466
[58] Field of Search ............... 364/474.27, 474.3, 364/474.16, 474.25, 474.35, 474.01, 474.03, 569, 946.2, 947.2, 426.01, 449.1; 318/569, 567, 568.18, 600, 603, 445, 448, 461, 466

[56] References Cited

U.S. PATENT DOCUMENTS

| | | | |
|---|---|---|---|
| 3,617,715 | 11/1971 | Dummermuth | 318/571 |
| 3,617,718 | 11/1971 | Dummermuth | 318/571 |
| 3,727,191 | 4/1973 | McGee | 364/474.3 |
| 4,074,177 | 2/1978 | Olig | 318/602 |
| 4,224,559 | 9/1980 | Miller | 318/601 |
| 4,225,928 | 9/1980 | Ohkubo | 364/474.14 |
| 4,891,568 | 1/1990 | Shibata et al. | 318/560 |
| 4,912,385 | 3/1990 | Kawamura et al. | 318/603 |
| 5,142,207 | 8/1992 | Song | 318/615 |
| 5,221,884 | 6/1993 | Teshima | 318/569 |

FOREIGN PATENT DOCUMENTS 2 102 590  2/1983  United Kingdom.

Primary Examiner—James P. Trammell
Assistant Examiner—Tuan Q. Dam
Attorney, Agent, or Firm—Nixon & Vanderhye P.C.

[57] ABSTRACT

An automatic positioning system in which a divider element divides the space between the initial position and the required final position into a predetermined number of well defined measurement positions at predetermined but not necessarily constant intervals, at these positions measurement means determining the effective time, velocity and acceleration values and hence the extent of disturbances as an acceleration difference, while suitable calculation means define the acceleration change to be applied to the drive member to compensate said disturbances and restore the predefined law of motion; two different calculation means are also defined.

4 Claims, 5 Drawing Sheets

AUTOMATIC POSITIONING SYSTEM

BACKGROUND AND SUMMARY OF THE INVENTION

This invention relates to a new automatic positioning system which besides enabling the desired position to be attained on the basis of the predefined theoretical relationship in a simple, economical, controlled and in particular precise manner and hence with the absence of hunting about the arrival position, also allows simultaneous measurement of the extent of the variation in acceleration due to disturbances tending to alter the positioning motion, so providing the data necessary for diagnosing the state of operation to achieve precise and targeted maintenance programming.

More specifically, the system of the invention implements a precise automatic control, in accordance with the desired theoretical relationship, of discrete physical quantities such as the position of the valving element of a valve or the arm of a power machine, etc.

In the known art, automatic positioning systems are already known in which normally the positioning is achieved by using a tachometric dynamo encoder to determine at constant fixed time intervals the effective velocity and the position achieved, and then controlling the drive member, generally a motor, on the basis of the deviations in said effective velocity and position values from the corresponding theoretical values according to the assumed law of motion.

Said known positioning systems, operating at constant time intervals, have however the drawback that the position and velocity values measured at the predefined times are inevitably affected by inaccuracies due to the resolution of the equipment used, and which affect the positioning accuracy. This drawback can obviously be overcome by using equipment of higher measuring resolution, such as so-called resolvers, but even with this solution, in addition to being very costly, the acceleration calculation in terms of the difference between two velocities measured successively in time divided by the time between the two measurements is of very little significance, when it is in fact essential for calculating the extent of the acceleration variation corresponding to the extent of the disturbance which alters the positioning motion.

The object of the present invention is to obviate said drawbacks by providing an automatic positioning system which in a simple and economical manner allows not only the effective position, time, velocity and consequently acceleration values to be precisely and reliably determined, but also the extent of the acceleration variation due to disturbances.

This is substantially attained in that instead of operating at constant time intervals, predetermined position intervals are used, which can also be different from each other. In other words in the interval between the starting position and the final position, intermediate measurement positions are set, at which the times are measured in an obviously extremely precise manner; as said position and time values are known exactly, exact velocity values can be calculated as the difference between two positions divided by the time which has passed, as can exact acceleration values as the difference between two velocities divided by the time which has passed, hence by using suitable means it is possible to determine not only the extent of the velocity variation, which as known depends on the disturbances, but also the correction to be made to the control of the drive member in order to compensate the discrepancies in the predefined theoretical drive relationship.

Hence, the system for automatic positioning in accordance with a predefined theoretical relationship, comprising a drive member with relative control device, a position measurer, a time measurer, a main memory storing at least the set velocity $V^*_{set}$, the set acceleration $a^*$, the initial position $S_o$ and the final required position $S_{set}$, is characterised according to the present invention in that an element dividing the space between said initial position $S_o$ and said final position $S_{set}$ into a predetermined number of well defined measurement positions at predetermined but not necessarily constant intervals, is connected, together with said position measurer, to a comparator the output of which activates measurement and calculation means which determine the effective velocity and acceleration values at said predetermined measurement positions, and from these values calculate the extent of the disturbances in terms of acceleration difference and also the acceleration change to be made to said drive member to compensate said disturbances.

Again, as a disturbance always produces an acceleration variation which affects the positioning, which is generally achieved from the starting position $S_o$ by means of an initial acceleration stage until the set velocity, a stage at constant velocity and a final deceleration stage until the required position $S_{set}$ is reached, said effective velocity and acceleration values at each measurement position are calculated by the known physical accelerating motion formula:

$$s = V_o t + \tfrac{1}{2} a t^2$$

where s is the space travelled through in time t, $V_o$ is the initial velocity and a is the acceleration. At the measured times $t_i$, where $i=1, 2, 3 \ldots$, ie the number of subdivisions of the space $S_o - S_{set}$, there will therefore be velocity values $V_i$ and acceleration values $a_i$. For a more precise determination of the corrections to be made, the notion of velocity at the time $t_i$, equal to $(S_i - S_{i-1})/(t_i - t_{i-1})$, which is substantially the average velocity along the path from the measurement position $S_{i-1}$ to the measurement position $S_i$, is distinguished from the instantaneous final velocity $V_i$ which is calculated assuming a linear velocity variation from $V_{i-1}$ to $V_i$; hence on this basis:

$$V_i = 2[(S_i - S_{i-1})/(t_i - t_{i-1})] - V_{i-1} \tag{1}$$

where $V_i$ is the velocity at the measurement position $S_i$ at time $t_i$ and $V_{i-1}$ is the velocity at the preceding measurement position $S_{i-1}$ at time $t_{i-1}$, and on the same basis:

$$a_i = (V_i - V_{i-1})/(t_i - t_{i-1}) \tag{2}$$

According to a preferred embodiment of the present invention, said measurement and calculation means know the predefined theoretical relationship for reaching the final position $S_{set}$ from $S_o$, and hence they know perfectly both the theoretical times $t^*_i$ and theoretical velocities $V^*_i$ which, in the absence of disturbances, apply to the different measurement positions $S_i$ and operate in the following manner.

Assuming that the predetermined position $S_n$ (see in FIG. 2 the diagram of velocity $V_i$ against time $t_i$, where the positions $S_i$ are evidently represented by the areas correspondingly delimited on the diagram itself) is reached in a measured effective time $t_n$ less than the theoretical time $t^*_n$, signifying that a disturbance has arisen (see FIG. 3) which has increased the velocity of said drive member from the value $V_{n-1}$ (which in FIG. 2 is equal to $V^*_{set}$) to the value $V_n$, said measurement and calculation means determine via (1) and (2) the the values of $V_n$ and $a_n$, given respectively by:

$$V_n = 2[(S_n - S_{n-1})/(t_n - t_{n-1})] - V_{n-1} \tag{3}$$

$$a_n=(V_n-V_{n-1})/(t_n-t_{n-1}) \qquad (4)$$

At this point, according to one characteristic of the present invention, said measurement and calculation means determine the acceleration change $\Delta a$ to be applied to said drive member to compensate said disturbance, imposing time conformity on the measurement position $S_{n+x}$, meaning that at the position $S_{n+x}$, where $x>1$, the time employed corresponds precisely to the theoretical time $t^*_{n+x}$, which, occurring only in the absence of disturbances, evidently implies the annulment of the time and velocity error caused by said disturbance. For this purpose, the accleration $a_{n+x}$ to be imposed on said drive member to achieve said result is determined via (1) and (2), ie:

$$a_{n+x}=(V_{n+x}-V_n)/(t^*_{n+x}-t_n) \qquad (5)$$

in which:

$$V_{n+x}=2[(S_{n+x}-S_n)/(t^*_{n+x}-t_n)]-V_n \qquad (6)$$

The required acceleration change to be applied to the drive member is hence evidently given by:

$$\Delta a=(a_{n+x}-a_n) \qquad (7)$$

Having reached the immediately following position $S_{n+1}$ at real time $t_{n+1}$, said measurement and calculation means repeat said operating cycle, checking whether the acceleration $a_{n+1}$ present in said position and obtained by applying (4), ie:

$$a_{n+1}=(V_{n+1}-V_n)/(t_{n+1}-t_n) \qquad (8)$$

where $V_{n+1}$ is obtained by applying (3), ie:

$$V_{n+1}=2[(S_{n+1}-S_n)/(t_{n+1}-t_n)]-V_n \qquad (9)$$

is equal to the set acceleration $a_{n+x}$ given by (5), the possible difference:

$$\Delta d=(a_{n+x}-a_{n+1}) \qquad (10)$$

represents the extent of the disturbance, which will be assumed to be annulled, together with the time and velocity error created by the disturbance itself, at the next position $S_{n+1+x}$ at the theoretical time $t^*_{n+1+x}$.

It has been found that with such measurement and calculation means the result is obtained of restoring respect for the predefined law of motion, ie restoring space-time and velocity conformity after a disturbance arises, by means of a number of iterations of the described procedure of between the mathematical minimum of three and six.

Hence, said measurement and calculation means comprise a position memory connected between the output of said comparator and one input of a first subtraction unit, to the second input of which there is connected said output of said comparator, the output of said first subtraction unit being connected to one input of a first velocity determining logic unit, to the other two inputs of which there are connected respectively the output of a velocity memory the input of which is connected to the output of said first logic unit, and the output of a second subtraction unit to the two inputs of which there are connected respectively the output of said time measurer and the output of a time memory the input of which is connected to said output of said time measurer; a calculation unit, storing the predetermined value of x where $x>1$, and of which its two inputs are connected respectively to said main memory, storing all the theoretical time values $t^*_i$ and theoretical velocity values $V^*_i$ which, in the absence of disturbances, are involved in the different measurement positions $S_i$, and to the output of said comparator whereas its two outputs, of the set position and of the relative theoretical time respectively, are connected to a third and to a fourth subtraction unit the other two inputs of which are connected to the outputs of said comparator and of said time measurer respectively, the outputs of said third and fourth subtraction units being connected to a second logic unit determining the set velocity, the third input of which is connected to said output of said first logic unit, the output of said second logic unit being connected to one input of a fifth subtraction unit the second input of which is connected to said output of said first logic unit, the output of this latter subtraction unit being connected, together with said output of said fourth subtraction unit, to a first divider the output of which is connected to an acceleration memory and to one input of a sixth subtraction unit the other input of which is connected to the output of a second divider the inputs of which are connected respectively to the output of said second subtraction unit and to the output of a seventh subtraction unit the inputs of which are connected to the outputs respectively of said first logic unit and of said velocity memory, the output of said sixth subtraction unit, providing the value representing the acceleration change to apply to said drive member, being connected to said control device, the output of said second divider being connected to one input of an eighth subtraction unit the other input of which is connected to the output of said acceleration memory, the output of said eighth subtraction unit providing the value representing the extent of any disturbances altering the positioning motion.

According to a modification of the present invention said measurement and calculation means do not impose time conformity with the scheduled law of motion, as in the preceding embodiment, but only the attainment of spatial objectives, in which the time employed depends on path obstacles and may also not coincide with the theoretical times, and in particular the achieving of stoppage of the drive member exactly on reaching the final set position $S_{set}$, ie said means firstly determining at each predetermined measurement position the operating stage in which to operate, ie whether in the acceleration, deceleration or constant velocity stage, and then calculating the particular acceleration value to be imposed so that by the next measurement point the acceleration variation caused by said disturbance has been compensated.

From the foregoing it is therefore apparent that said modified embodiment no longer requires previous knowledge of the entire profile of the law of positioning motion, but only of the set velocity value $V^*_{set}$, of the set acceleration value $a^*$ and of the initial position value $S_o$ and final position value $S_{set}$ in that at each measurement position it always adapts the law of motion to the result to be obtained; said modified embodiment is therefore particularly suitable in those cases in which positioning is achieved with a continuously variable law of motion.

In other words, at each measurement position, for example the position $S_n$, the values of $V_n$ and of $a_n$ are calculated by the formulas (3) and (4) as in the preceding case, after which it is immediately ascertained whether the space remaining to stoppage ($S_{set}-S_n$) is less than or equal to a certain limiting value, to ascertain whether the deceleration stage is underway or not. Said limiting value is obtained from the known physical accelerating motion formula assuming that the initial velocity and space are zero, ie from:

$$S=\tfrac{1}{2}at^2$$

from which, as V=at, one obtains:

$$S = V^2/2a \qquad (11)$$

this formula determining the space travelled for a given initial velocity V and for a given acceleration or deceleration a.

Consequently as a* is the set acceleration, said limiting value is given by $V^2_n/2a^*$, hence it has to be ascertained whether:

$$(S_{set} - S_n) \leq V^2_n/2a^* \qquad (12)$$

If this relationship is satisfied, indicating that the deceleration stage is to be entered, that specific acceleration a' is set which, for the measured velocity $V_n$ and for said available space $(S_{set} - S_n)$, ensures motion stoppage precisely at the set position $S_{set}$, this acceleration, obtained from (11), being given by:

$$a' = V^2_n/2(S_{set} - S_n) \qquad (13)$$

If instead said relationship is not satisfied, it is then ascertained whether said measured velocity $V_n$ is greater than or equal to the set velocity $V^*_{set}$, ie whether:

$$V_n \geq V^*_{set} \qquad (14)$$

If this latter relationship is not satisfied, indicating that the acceleration stage is still underway, an acceleration is imposed equal to the set acceleration a*; if however the relationship is satisfied that condition is imposed which at the next position $S_{n+1}$ makes the effective velocity again equal to the set velocity $V^*_{set}$. For this purpose the specific time $\Delta t$ required to travel through the space $(S_{n+1} - S_n)$ at the average velocity $(V_n + V^*_{set})/2$ is determined, ie:

$$\Delta t = 2(S_{n+1} - S_n)/(V_n + V^*_{set}) \qquad (15)$$

and hence an acceleration a is imposed which achieves a velocity change of $(V^*_{set} - V_n)$ within said time $\Delta t$, ie:

$$a = (V^*_{set} - V_n)/\Delta t \qquad (16)$$

From the aforegoing and referring to FIGS. 6 and 7, it is apparent that if a disturbance A arises at the theoretical moment $t^*_1$ coinciding with the real time $t_1$, ie during the acceleration stage so that neither of the relationships (12) and (14) is satisfied, the disturbance determining a variation in motion such that at the next measurement position $S_2$ the location, instead of being at the point 2 at the theoretical moment $t^*_2$, is in fact the point 2' at the real time $t_2$, then corrective action is taken by imposing on the drive member at the time $t_2$ an acceleration equal to the set acceleration a* so that the diagram of motion is modified to that shown by full lines. Likewise a disturbance B an time $t_5$, ie during the constant velocity stage, will result in (12) not being satisfied but in (14) being satisfied in that the velocity in the measurement position $S_6$ becomes greater than the set velocity $V^*_{set}$. In this case the action taken is such that by the next measurement position $S_7$ the velocity has returned to the set velocity $V^*_{set}$, for which purpose the acceleration imposed is the acceleration a indicated by (16). Finally, the presence of a disturbance C at time $t_{10}$, ie during the deceleration stage so that the relationship (12) is satisfied, is compensated by imposing at time $t_{11}$ corresponding to the measurement position $S_{11}$ an acceleration a given by (13).

Essentially, according to a main characteristic of the present modified embodiment, the disturbance is always compensated by a single specific correction depending on the stage of operation, whereas there is evidently no further recovery of coincidence between real times $t_i$ and theoretical times $t^*_i$, as is also clearly visible from said figures.

Hence, according to a further characteristic of the present invention, said measurement means comprise a position memory connected between the output of said comparator and one input of a first subtraction unit, to the second input of which there is connected said output of said comparator, the output of said first subtraction unit being connected to one input of a first velocity determining logic unit, to the other two inputs of which there are connected respectively the output of a velocity memory the input of which is connected to the output of said first logic unit, and the output of a second subtraction unit to the two inputs of which there are connected respectively the output of said time measurer and the output of a time memory the input of which is connected to said output of said time measurer, the output of said first velocity determining logic unit and the output of said velocity memory being connected to the inputs of a seventh subtraction unit the output of which is connected to one input of a second divider the other input of which is connected to the output of said second subtraction unit, and the output of which is connected to one input of an eighth subtraction unit; a multiplier-squarer connected between the output of said first logic unit and one input of a third divider the output of which is connected to a first gate circuit which is connected, via an acceleration memory, to the other input of said eighth subtraction unit the output of which provides the value representing the extent of any disturbances altering the positioning motion, and to one input of a sixth subtraction unit which, connected to the output of said second divider, provides as output the value representing the acceleration change to be imposed on said drive member, the other input of said third divider being connected to the output of a ninth subtraction unit, the inputs of which are connected respectively to the output of said comparator and to the output of said main memory relative to the final position value $S_{set}$, the output of said ninth subtraction unit being connected, together with the output of said multiplier-squarer and with the output of said main memory relative to the set acceleration value a*, to the inputs of a first comparator selector the "yes" output of which controls said first gate circuit, its "no" output activating a second comparator selector the inputs of which are connected respectively to the output of said first logic unit and to the output of said main memory relative to the set velocity value $V^*_{set}$, its "no" output controlling a second gate circuit connected between the output of said first gate circuit and said output of said main memory relative to the acceleration value a*, its "yes" output controlling a third gate circuit connected between said output of said first gate circuit and the output of a first divider to the two inputs of which there are connected respectively the output of a tenth subtraction unit, the inputs of which are connected to the output of said first logic unit and to said output of the main memory relative to the value $V^*_{set}$, and the output of a fourth divider the two inputs of which are connected respectively to the output of an adder, to the inputs of which are connected the outputs respectively of said first logic unit and of said main memory relative to the value $V^*_{set}$, and to the output of a third subtraction unit the two inputs of which are connected to the output of said comparator and to the output of a selection unit which, controlled by the output of said comparator, obtains the next position value from said space divider.

The invention will be more apparent with reference to the accompanying drawings which show preferred embodiments thereof given by way of non-limiting example in that technical or constructional modifications can be made thereto without leaving the scope of the present invention.

DETAILED DESCRIPTION OF EMBODIMENTS SHOWN IN FIGURES

Figure 1:
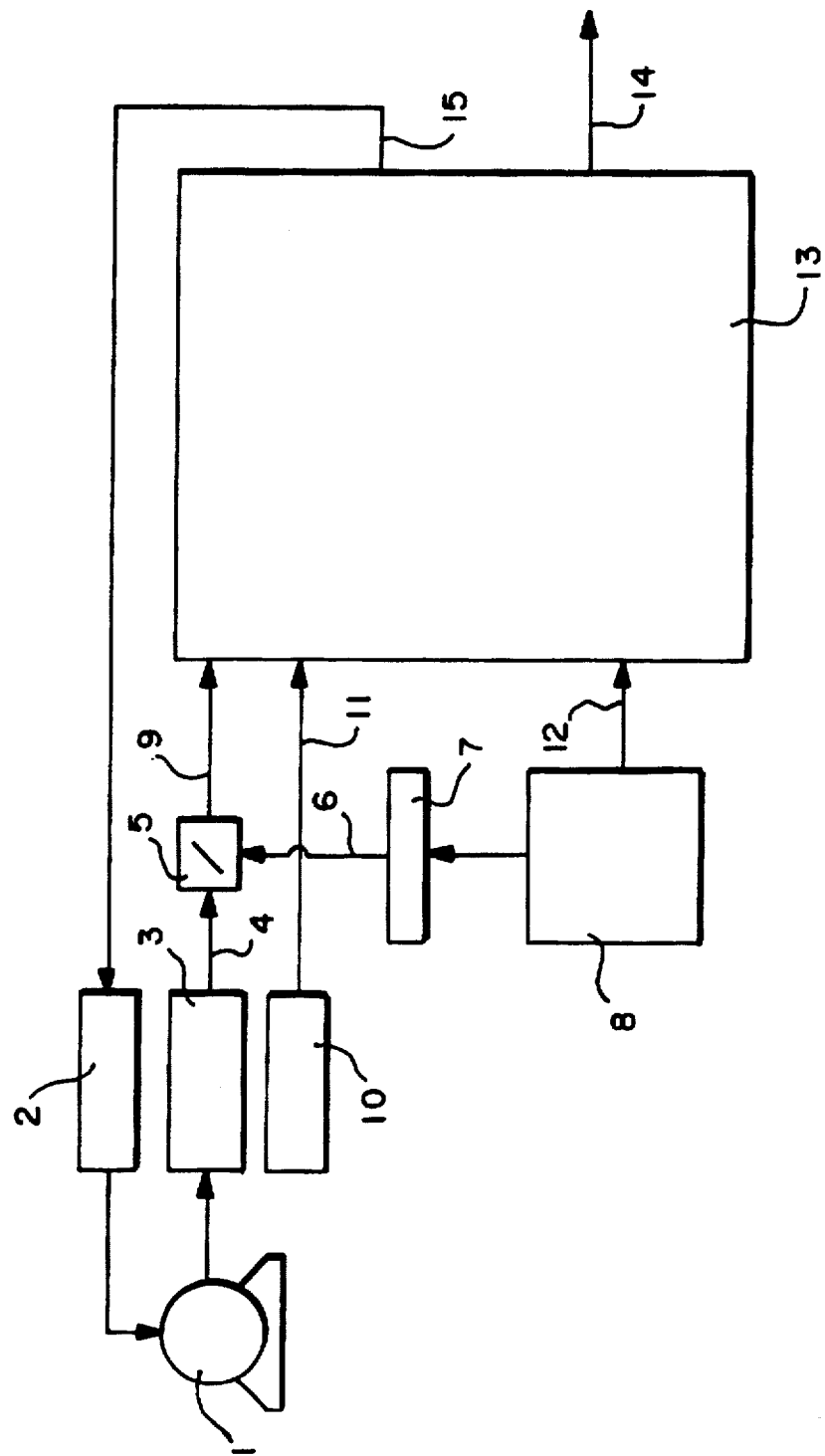
FIG. 1 is a block scheme showing the automatic positioning system according to the invention.
Figure 2:
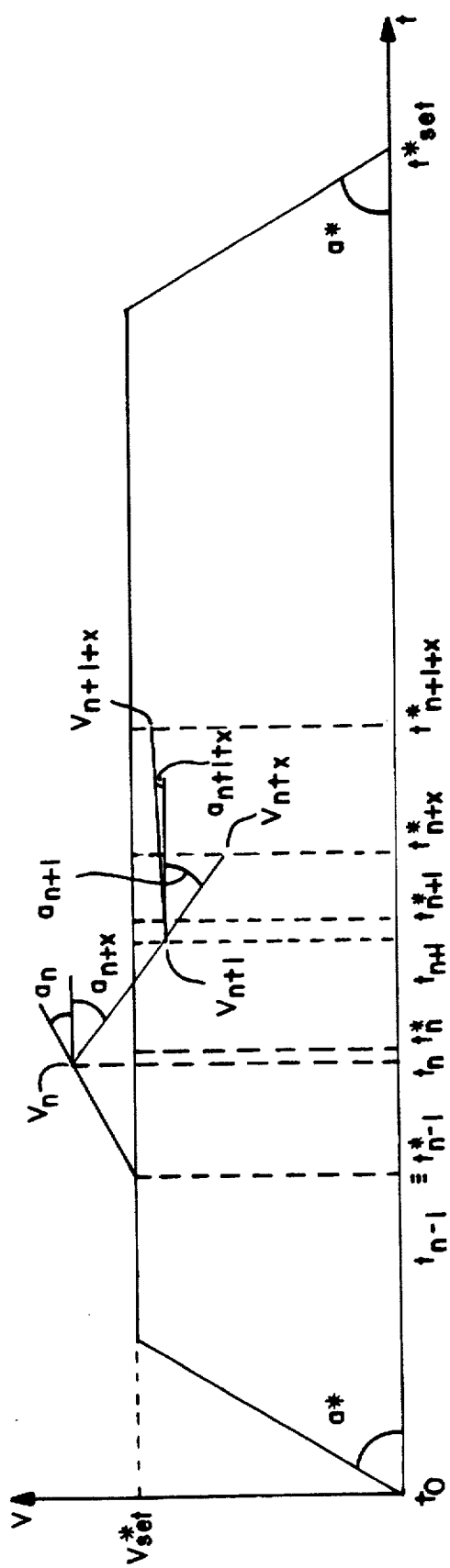
FIG. 2 shows the variation of velocity $V_i$ with time $t_i$ during compensation, in accordance with the invention.
Figure 3:
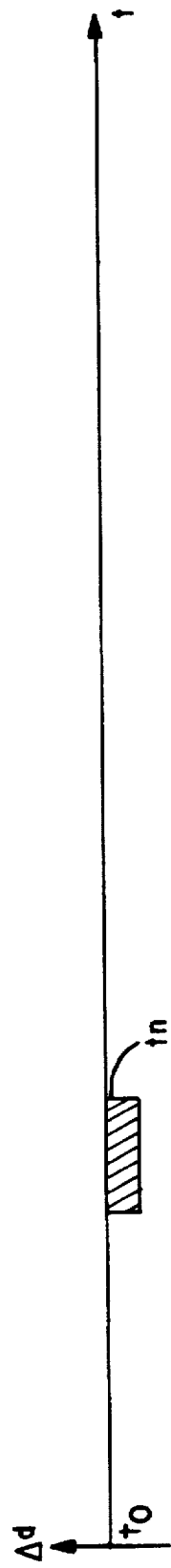
FIG. 3 is a disturbance.
Figure 4:
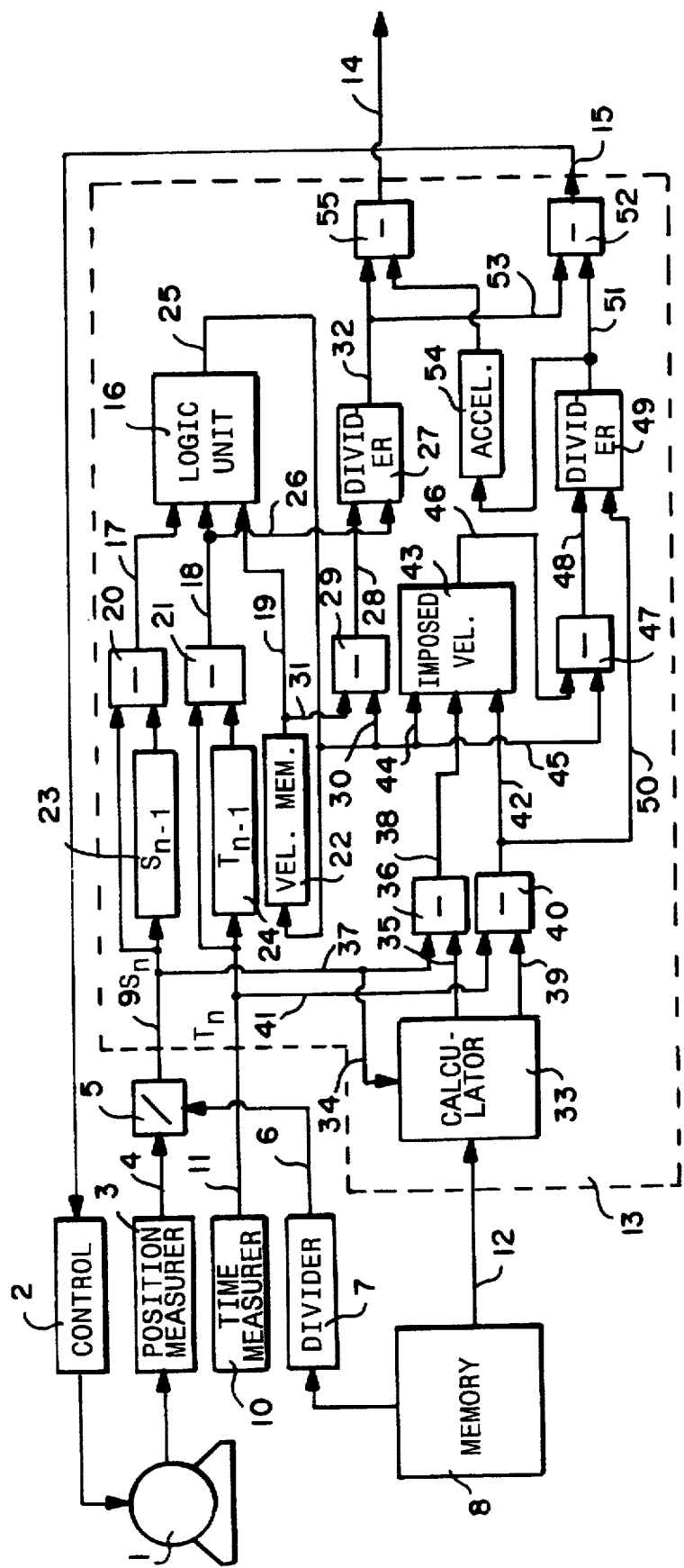
FIG. 4 is a block scheme showing the measurement means, in accordance with the invention, of the system of FIG. 1.

With reference to the figures, in which corresponding elements are indicated by the same reference numerals, in FIG. 4 the drive member 1 of the automatic positioning system which, controlled by the control device 2, acts on the position measurer 3 the output 4 of which is connected to a comparator 5 together with the output 6 of a divider element 7 which, connected to a main memory 8 storing not only the values representing the set velocity $V^*_{set}$, set acceleration $a^*$, initial position $S_o$ and required final position $S_{set}$, but also all theoretical time values $t^*_i$ and theoretical velocity values $V^*_i$ which, in the absence of disturbances, are involved in the various measurement positions $S_i$, divides the space between said initial position $S_o$ and said final position $S_{set}$ into a predetermined number of well defined intermediate measurement positions $S_i$ at predefined but not necessarily constant intervals. The output 9 of said comparator 5, which provides the value representing the various predetermined intermediate measurement positions, in particular the value $S_n$ at the time $t_n$ measured by the time measurer 10 which operates synchronously with the other system units, is fed, together with the output 11 of said time measurer 10 and with the output 12 of said main memory 8, to activate the measurement and calculation means 13 which, at said predetermined measurement positions $S_i$, determine the effective velocity and acceleration values and provide at the output 14 the extent of the disturbances as an acceleration difference and at the output 15 the acceleration change which, by means of said control device 2, has to be applied to said drive member 1 to compensate said disturbances.

According to a preferred embodiment of the present invention, shown in FIG. 4, said measurement and calculation means 13 comprise a first logic unit 16 determining the real velocity which at the time $t_n$ is represented by $V_n$. In this respect the inputs of said logic unit 16 receive the outputs 17, 18 and 19 respectively of a first subtraction unit 20, of a second subtraction unit 21 and of a velocity memory 22 storing the velocity value $V_{n-1}$ calculated at the preceding measurement position $S_{n-1}$.

The input of said first subtraction unit 20 is fed with the position value $S_n$ present at the output of said comparator 5 and with the value $S_{n-1}$ previously memorized in the position memory 23, so that the value $(S_n-S_{n-1})$ is present at said output 17. Likewise, the input of said second subtraction unit 21 is fed with the time value $T_n$ present at the output 11 of said time measurer 10 and with the time value $t_{n-1}$ stored in the time memory 24, so that the value $(t_n-t_{n-1})$ is present at said output 18. From the aforegoing it follows that the value $V_n$ calculated by (3) is present at the output 25 of said logic unit 16, this value being fed to the input of said velocity memory 22. Said value $(t_n-t_{n-1})$ present at the output 18 of said second subtraction unit 21 is then fed via the line 26 to one input of a second divider unit 27, the other input of which is fed with the output 28 of a seventh subtraction unit 29, the two inputs 30 and 31 of which are fed respectively with the value $V_n$ present at the output 25 of said first logic unit 16 and with the value $V_{n-1}$ present at the output 19 of said velocity memory 22, so that at said output 28 the value $(V_n-V_{n-1})$ is present and consequently at the output 32 of said second divider 27 the acceleration value $a_n$ is present. Said measurement and calculation means 13 also comprise a calculation unit 33 storing the predetermined value of x where x>1, which is controlled, via the lines 34 and 37, by the value $S_n$ present at the output 9 of said comparator 5 and obtains via said output 12 the position value $S_{n+x}$ and the relative theoretical time value $t^*_{n+x}$ from the main memory 8 in which they are stored for this purpose, in addition to the values representing the set velocity $V^*_{set}$, the set acceleration $a^*$, the initial position $S_o$ and the required final position $S_{set}$ and all the theoretical time values $t^*_i$ and theoretical velocity values $V^*_i$ which, in the absence of disturbances, are involved in the various measurement positions $S_i$. Said value $S_{n+x}$ present at the imposed position output 35 of said calculation unit 33 is fed to a third subtraction unit 36 which is connected to said output 9 of the comparator 5 via the line 37 to hence provide at its output 38 the value $(S_{n+x}-S_n)$. Likewise said value $t^*_{n+x}$ present at the theoretical time output 39 of said calculation unit 33 is fed to a fourth subtraction unit 40 which is connected to said output 11 of the time measurer 10 via the line 41 to provide the value $(t^*_{n+x}-t_n)$ at its output 42. Said outputs 38 and 42 are connected to a second imposed velocity determination unit 43 which is fed via the lines 44 and 45 with the value $V_n$ present at said output 25 of said first logic unit 16 to hence provide at its output 46 the imposed velocity value $V_{n+x}$, calculated in accordance with (6). This latter output 46 is connected to a fifth subtraction unit 47 which is also fed with said value $V_n$ via said lead 45 to provide at its output 48 the value $(V_{n+x}-V_n)$ which is fed to a first divider 49 together, via the lead 50, with the value $(t^*_{n+x}-t_n)$ present at the output 42 of said fourth subtraction unit 40, to obtain at the output 51 of said first divider 49 the imposed acceleration value $a_{n+x}$, calculated in accordance with (5). Finally, said imposed acceleration value $a_{n+x}$ present at said output 51 is fed to a sixth subtraction unit 52 together, via the line 53, with the calculated value of $a_n$ present at said output 32 of said second divider 27, so that at the output 15 of said sixth subtraction unit 52 there is the value $\Delta a$, expressed by (7), representing the acceleration change to be made to said drive member 1, via the control device 2, to compensate the disturbances. Said imposed acceleration value $a_{n+x}$ fed via an acceleration memory 54 to an eighth subtraction unit 55 to which the acceleration value $a_n$ present at said output 32 of said second divider 27 is also fed, enables the value $\Delta d$, expressed by (10) and indicating the extent of any disturbances present, to be obtained at the output 14 of said eighth subtraction unit 55.

Figure 5:
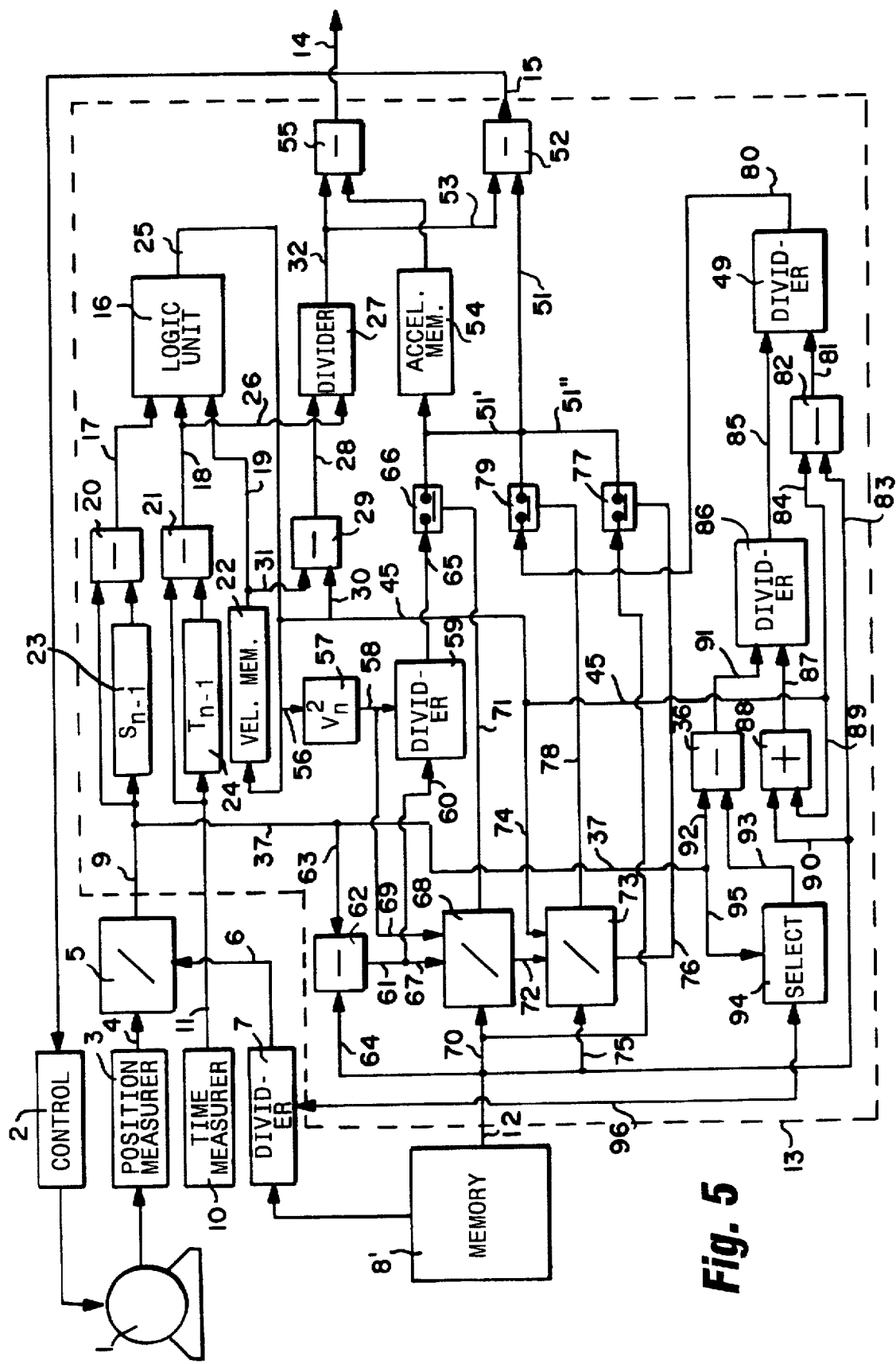
FIG. 5 is a block scheme showing a modified embodiment of the measurement means of the system of FIG. 1.
Figure 6:
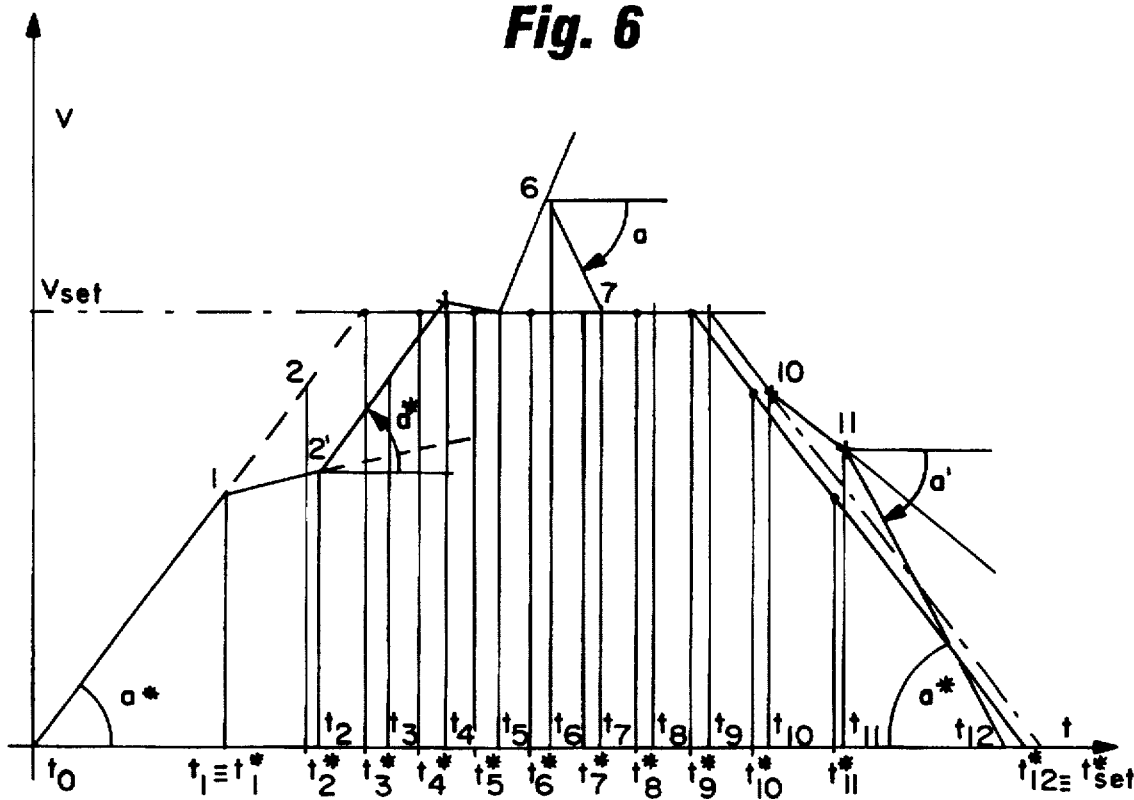
FIG. 6 shows the variation of velocity $V_i$ with time $t_i$ during compensation.
Figure 7:
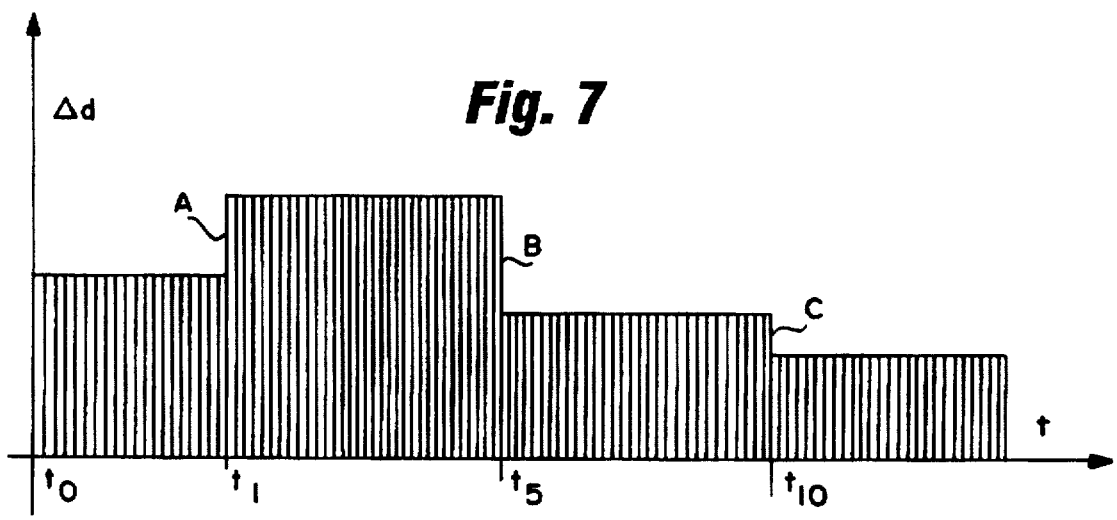
FIG. 7 is a plurality of disturbances.

In the modified embodiment of the present invention shown in FIG. 5, said measurement and calculation means 13 use the same elements as the aforedescribed embodiment illustrated in FIG. 4 to obtain the velocity value $V_n$ as the output 25 of said first real velocity determination logic unit 16 and the acceleration value $a_n$ at the output 32 of said second divider 27. In a like manner, the acceleration change to be applied to said drive member is obtained from the output of the seventh subtraction unit 52 the input 53 of which is connected to the output of said second divider 27, the extent of disturbances being obtained at the output of the eighth subtraction unit 55 the inputs of which are connected respectively to the output of said second divider 27 and to the output of said acceleration memory 54.

What differs with this modified embodiment is the specific manner in which the values to be fed into said acceleration memory 54 and to the input 51 of said sixth subtraction unit 52 are selected and calculated.

In this respect, with said modified embodiment the value $V_n$ present at the output 25 of said first logic unit 16 is fed to the input 56 of a multiplier squarer 57, the output 58 of which hence feeds the value $V^2_n$ to one input of a third divider 59, the other input 60 of which is connected to the output 61 of a ninth subtraction unit 62 the inputs 63 and 64 of which are connected respectively to the output 9 of said comparator 5 via the lead 37 and to the main memory 8', relative only to the final position value $S_{set}$ via said output lead 12. The output 65 of said third divider 59, in which the acceleration value a expressed by (13) ie $a'=V^2_n/2(S_{set}-S_n)$ is hence present, is connected to a first gate circuit 66 connected to said acceleration memory 54 and, via the lead 51', to said input 51 of said sixth subtraction unit 52. Said output 61, containing the value $(S_{set}-S_n)$, of said ninth subtraction unit 62 is connected to one input 67 of a first comparator selector 68 the other two inputs 69 and 70 of which are connected respectively to said output 58 of said multiplier squarer 57 and to said output 12, relative only to the set acceleration value a*, of said main memory 8'. Said first comparator selector 68 verifies the relationship $(S_{set}-S_n) \leq V^2_n/2a^*$, its "yes" output 71 being used to close said first gate circuit 66 whereas its "no" output 72 activates a second comparator selector 73 the two inputs 74 and 75 of which are connected respectively to the output 25 of said first logic unit 16 via the lead 45 and 74, and to the output 12, relative only to the set velocity value $V^*_{set}$ of said main memory 8'. Said second comparator selector 73 verifies the relationship $V_n \geq V^*_{set}$, its "no" output 76 being used to close a second gate circuit 77 connected between the output 12, relative only to the set acceleration a*, of said main memory 8' and, respectively, said input 51 of said sixth subtraction unit 52 via the lead 51" and said acceleration memory 54 via said lead 51'. The "yes" output 78 of said second comparator selector 73 closes a third gate circuit 79 connected between said input 51 and, via said lead 51', said acceleration memory 54 and the output 80 of a first divider 49 containing the acceleration value a expressed by (16). For this purpose, the two inputs of said first divider 49 are connected respectively to the output 81 of a tenth subtraction unit 82 having its inputs 83 and 84 connected respectively to the output 12 relative only to the set velocity value $V^*_{set}$ of said main memory 8' and via the lead 45 to the output 25 of said first logic unit 16 to provide the value $(V^*_{set}-V_n)$ at said output 81, and to the output 85 of a fourth divider 86 which provides the value $\Delta t$ expressed by (15). In this respect, the two inputs of said fourth divider 86 are fed with the value $(V^*_{set}+V_n)$ present at the output 87 of an adder 88 connected to said output 25 of said first logic unit 16 via leads 89 and 45 and to the output 12 relative only to the set velocity value $V^*_{set}$ of said main memory 8' via the lead 90, and with the value $2(S_{n+1}-S_n)$ present at the output 91 of a third subtraction unit 36 which is connected to said output 9 of the comparator 5 via leads 92 and 37 and, via the lead 93, to a selection unit 94 connected via the leads 95 and 37 to the output 9 of the comparator 5 where the value $S_n$ is present, and via the lead 96 to the space divider 7 to provide in said lead 93 the next position value, ie $S_{n+1}$.

The method of operating this modified embodiment is now apparent. At each measurement position $S_n$, the system measures the velocity value $V_n$ at the output 25 of said first logic unit 16 and the acceleration value $a_n$ at the output 32 of said second divider 27, and then with the two comparator selectors 68 and 73 determines the specific position of operation with respect to the final position $S_{set}$, after which if it is in the deceleration stage said first gate circuit 66 is closed, with the result that the drive member 1 is subjected to an imposed acceleration a' given by (13) or rather to an imposed acceleration equal to the difference $(a'-a_n)$, $a_n$ being the acceleration already possessed by said drive member; if instead it is in the acceleration stage the second gate circuit 77 is closed, with the result that an acceleration is imposed equal to the set acceleration a*, and finally if in the constant velocity stage but with the velocity greater than the set velocity $V^*_{set}$, the third gate circuit 79 is closed with the result that an acceleration a given by (16) is imposed.

We claim:

1. A system for automatic positioning in accordance with a predefined theoretical relationship, comprising:

a drive member with a relative control device, a position measurer, a time measurer, a main memory storing at least a set velocity $V^*_{set}$, a set acceleration a*, an initial position $S_0$ and a final required position $S_{set}$, a dividing element divides the space between said initial position $S_0$ and said final position $S_{set}$ into a predetermined number of measurement positions at predetermined non-uniform intervals, the dividing element is connected with said position measurer, to a comparator having an output that activates a measurement and calculation means for determining effective velocity and acceleration values at said measurement positions, and from the velocity and acceleration values the measurement and calculation means calculates an extent of disturbance as an acceleration difference and as an acceleration change to be made to said drive member to compensate for said disturbance.

2. An automatic positioning system as claimed in claim 1, wherein said measurement and calculation means further comprises:

a position memory connected between the output of said comparator and one input of a first subtraction unit, a second input of the first subtraction unit is connected to said output of said comparator, the output of said first subtraction unit being connected to one input of a first velocity determining logic unit, where the first velocity determining logic unit having a second input connected to an output of a velocity memory having an input connected to an output of said first velocity determining logic unit, and the first velocity determining logic unit having a third input connected to an output of a second subtraction unit having two inputs connected respectively to an output of said time measurer and an output of a time memory having an input connected to said output of said time measurer;

a calculation unit, storing a predetermined value of x where x>1, and having two inputs connected respectively to said main memory, storing theoretical time values $t^*_i$ and theoretical velocity values $V^*_i$ which, represent theoretical time and velocity values for the apparatus in the absence of a disturbance, where the theoretical time and velocity values are involved in the determining different measurement positions $S_i$, and to the output of said comparator, the calculation unit has two outputs of a set position value and of a relative theoretical time value, which calculation unit outputs are connected, respectively, to a third and to fourth subtraction units;

whereas another input of the third subtraction unit is connected to the output of said comparator and another input of the fourth subtraction unit is connected to an output of said time measurer, the outputs of said third and fourth subtraction units being connected to a first and second input, respectively, of a second logic unit determining a set velocity, and a third input of second logic unit is connected to said output of said first logic unit, an output of said second logic unit being connected to one input of a fifth subtraction unit having a second input connected to said output of said first logic unit, an output of the fifth subtraction unit being connected, together with said output of said fourth subtraction unit, to a first divider having an output connected to an acceleration memory and to the input of a sixth subtraction unit, another input of the sixth subtraction unit is connected to an output of a second divider, the inputs of the second divider are connected, respectively, to the output of said second subtraction unit and to an output of a seventh subtraction unit having inputs connected to the outputs, respectively, of said first logic unit and of said velocity memory, the output of said sixth subtraction unit, providing a value representing the acceleration change to apply to said drive member, being connected to said control device, an output of said second divider being connected to one input of an eighth subtraction unit, another input of the eighth subtraction unit is connected to said output of said acceleration memory, an output of said eighth subtraction unit providing the value representing the extent of any disturbances altering the positioning motion.

3. An automatic positioning system as claimed in claim 1, wherein said measurement and calculation means further comprise:

a position memory connected between the output of said comparator and one input of a first subtraction unit, where a second input of the first subtraction unit is connected said output of said comparator, an output of said first subtraction unit being connected to one input of a first velocity determining logic unit having a second input connected to the output of a velocity memory, where an input of the velocity memory is connected to an output of said first logic unit, and the first velocity determining logic unit having a third input connected to an output of a second subtraction unit that has two inputs connected, respectively, the output of said time measurer and the output of a time memory, the input of the time memory is connected to said output of said time measurer, the output of said first velocity determining logic unit and the output of said velocity memory being connected to inputs of a seventh subtraction unit, the output of seventh subtraction unit is connected to one input of a second divider, the other input of second divider is connected to the output of said second subtraction unit, and an output of the second divider is connected to one input of an eighth subtraction unit;

a multiplier-squarer connected between the output of said first logic unit and one input of a third divider the output of the third divider is connected to a first gate circuit which is connected, via an acceleration memory, to another input of said eighth subtraction unit, the output of the eighth subtraction unit provides a value representing the extent of any disturbances altering the positioning motion, and to one input of a sixth subtraction unit, which sixth subtraction unit is connected to the output of said second divider, and provides as an output a value representing the acceleration change to be imposed on said drive member, another input of said third divider being connected to an output of a ninth subtraction unit, a first input of the ninth subtraction unit is connected to the output of said comparator and a second input of the ninth subtraction unit is connected to the output of said main memory relative to the final position value $S_{set}$, an output of said ninth subtraction unit being connected, together with the output of said multiplier-squarer and with the output of said main memory relative to the set acceleration value $a^*$, to inputs of a first comparator selector having a "yes" output which controls said first gate circuit, and a "no" output activating a second comparator selector, and inputs of the second comparator selector are connected, respectively, to the output of said first logic unit and to the output of said main memory for the set velocity value $V^*_{set}$, where the second comparator selector having a "no" output controlling a second gate circuit connected between the output of said first gate circuit and said output of said main memory relative to the acceleration value $a^*$, and where the second comparator selector having a "yes" output controlling a third gate circuit connected between said output of said first gate circuit and the output of a first divider having two inputs connected, respectively, to an output of a tenth subtraction unit, the inputs of which tenth subtraction unit are connected to the output of said first logic unit, and to said output of the main memory relative to the value $V^*_{set}$, and an output of a fourth divider, the two inputs of which fourth divider are connected, respectively, to an output of an adder, to the inputs of which adder are connected to the outputs, respectively, of said first logic unit and of said main memory relative to the value $V^*_{set}$ and to an output of a third subtraction unit having two inputs connected, respectively, to the output of said comparator and to an output of a selection unit which, controlled by the output of said comparator, obtains a next position value from said dividing element.

4. A system for automatic positioning in accordance with a predefined theoretical relationship, comprising:

a drive member with a relative control device, a position measurer, a time measurer, a main memory storing at least a set velocity $V^*_{set}$, a set acceleration $a^*$, an initial position $S_o$ and a final required position $S_{set}$.

a dividing element divides the space between said initial position $S_o$ and said final position $S_{set}$ into a predetermined number of measurement positions at predetermined but not necessarily constant intervals, the dividing element is connected with said position measurer to a comparator having an output that activates a measurement and calculation means for determining effective velocity and accleration values at said measurement positions, and from the velocity and acceleration values the measurement and calculation means calculates an extent of disturbance as an accleration change to be made to said drive member.

* * * * *